(12) United States Patent
Tang

(10) Patent No.: US 12,721,301 B2
(45) Date of Patent: Sep. 1, 2026

(54) PET TOILET AND CONTROL METHOD THEREOF

(71) Applicant: PETPIVOT INC, Portland, OR (US)

(72) Inventor: Tieqiang Tang, Shaoyang City (CN)

(73) Assignee: PETPIVOT INC, Portland, OR (US)

( * ) Notice: Subject to any disclaimer, the term of this patent is extended or adjusted under 35 U.S.C. 154(b) by 208 days.

(21) Appl. No.: 18/506,983

(22) Filed: Nov. 10, 2023

(65) Prior Publication Data

US 2025/0134059 A1 May 1, 2025

Related U.S. Application Data

(63) Continuation-in-part of application No. 18/494,672, filed on Oct. 25, 2023, now abandoned.

(30) Foreign Application Priority Data

Oct. 30, 2023 (CN) ......................... 202322919901.8
Nov. 7, 2023 (CN) ......................... 202323002857.0

(51) Int. Cl.
*A01K 1/01* (2006.01)
*A01K 29/00* (2006.01)

(52) U.S. Cl.
CPC ............ *A01K 1/0114* (2013.01); *A01K 1/011* (2013.01); *A01K 1/0117* (2013.01); *A01K 29/005* (2013.01)

(58) Field of Classification Search
CPC .... A01K 1/0114; A01K 1/011; A01K 1/0117; A01K 29/005
See application file for complete search history.

(56) References Cited

U.S. PATENT DOCUMENTS

2006/0081191 A1* 4/2006 Deasy .................. A01K 1/0114 119/166
2015/0113878 A1* 4/2015 Sward ....................... E06B 7/32 49/63
2020/0042780 A1* 2/2020 Hori ..................... A01K 1/0107
2022/0322632 A1* 10/2022 Baxter ................... A01K 1/011
2024/0206422 A1* 6/2024 Wang .................. A01K 1/0047

* cited by examiner

*Primary Examiner* — Michael W Choi

(57) ABSTRACT

The present disclosure provides a pet toilet and a control method thereof. The pet toilet includes a circuit board, an identification module, a base and a roller rotatably arranged on the base. The identification module is electrically connected to the circuit board to acquire an image, and the circuit board controls the roller to rotate after the identification module identifies that a pet has left the roller. Therefore, the circuit board controls the roller to rotate after the identification module identifies that the pet has left the roller, so as to solve the problem of misjudgment easily caused by the fact that only a weighing sensor is used to perform waste cleaning in the prior art. The probability of misjudgment on the defecation of a pet is effectively reduced. The number of times of rotation of the roller is reduced. The power consumption is reduced.

7 Claims, 6 Drawing Sheets

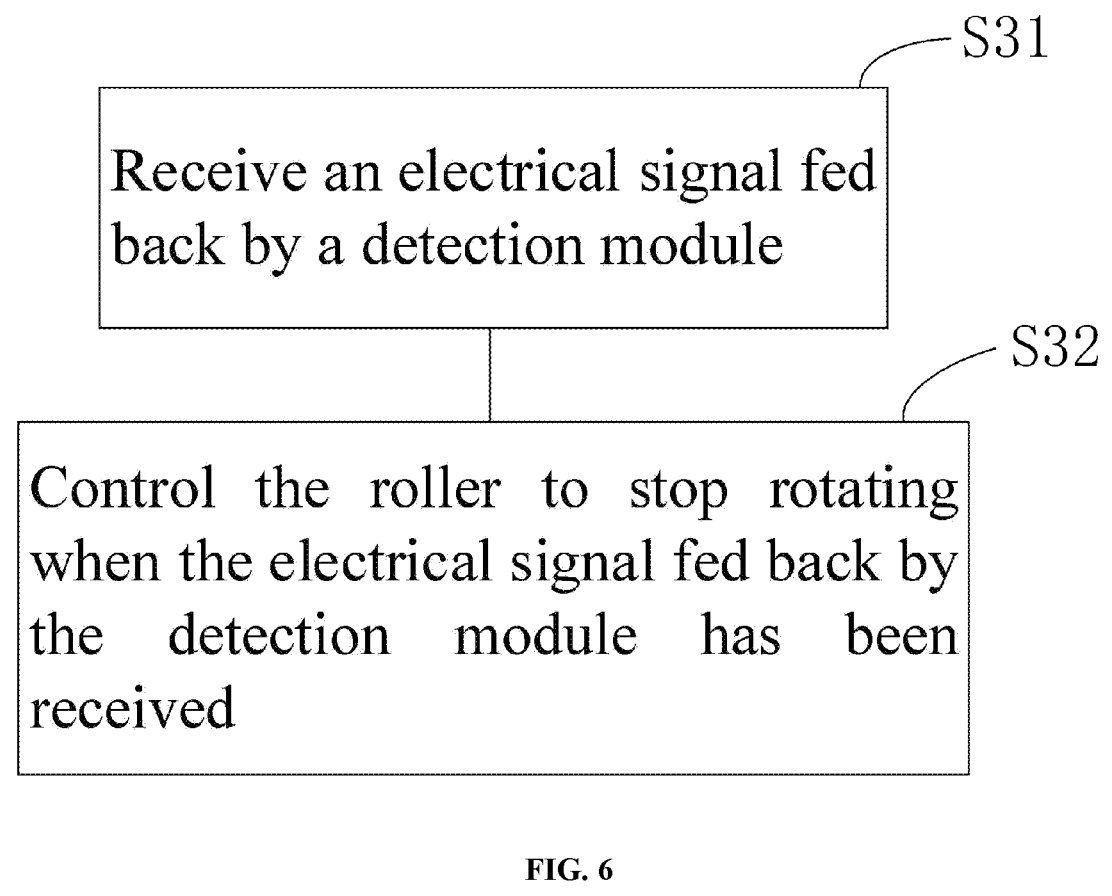

S31

Receive an electrical signal fed back by a detection module

S32

Control the roller to stop rotating when the electrical signal fed back by the detection module has been received

FIG. 6

PET TOILET AND CONTROL METHOD THEREOF

CROSS-REFERENCE TO RELATED APPLICATIONS

This application is a Continuation-in-Part of the U.S. application Ser. No. 18/494,672 filed on Oct. 25, 2023, and entitled "PET TOILET AND CONTROL METHOD THEREOF", now pending, also claims priority of Chinese patent application CN2023229199018, filed on Oct. 30, 2023, and entitled "A PET TOILET AND A CONTROL METHOD THEREOF", and claims priority of Chinese patent application CN2023230028570, filed on Nov. 7, 2023, and entitled "A PET TOILET AND A CONTROL METHOD THEREOF", the entire disclosures of which are incorporated herein by reference.

TECHNICAL FIELD

The present disclosure relates to the technical field of pet supplies, and in particular, to a pet toilet and a control method thereof.

BACKGROUND

An intelligent litter box includes a base and a roller arranged on the base. The base is also provided with a collection basin for collecting waste. When the roller rotates relative to the base, litter and waste formed by combining feces and litter are first sifted through a sifter inside the roller. The litter passes through meshes of the sifter and is temporarily stored, and the waste falls onto the collection basin from an opening on the roller as the roller rotates. After completing the action, the roller rolls back to an initial position.

At present, the intelligent litter box is provided with a weighing sensor on the base to determine whether a cat has entered the roller for defecation. That is, when the cat has entered the roller, the weighing sensor detects a change in weight and provides a feedback to a controller. After the cat leaves, the weighing sensor provides a feedback to the controller to determine that the cat has left. After the cat leaves, the roller is controlled to rotate to discharge the waste. However, in this way, when the cat jumps over the roller to play or sleep, an action of cleaning up waste would also be performed after the cat leaves. This easily causes a misjudgment.

SUMMARY

The present disclosure aims to provide a pet toilet and a control method thereof, which is used to solve the problem of misjudgment easily caused the fact that only the weighing sensor is used to perform waste clearing in the prior art.

In order to solve the technical problem, the technical scheme provided by the present disclosure is as follows.

A pet toilet includes a circuit board, an identification module, a base and a roller rotatably arranged on the base. The identification module is electrically connected to the circuit board to acquire an image, and the circuit board controls the roller to rotate after the identification module identifies that a pet has left the roller.

Preferably, the pet toilet further includes a detection module electrically connected to the circuit board to detect get close of an object, wherein the circuit board controls the roller to stop rotating according to a signal fed back by the detection module.

Preferably, the pet toilet further includes a weighing sensor for weighing, arranged on the roller or the base, wherein the circuit board is electrically connected to the weighing sensor and controls the roller to rotate according to an electrical signal fed back by the weighing sensor and a signal fed back by the identification module.

Preferably, the roller is provided with an entrance/exit, and the detection module is arranged at or near the entrance/exit;

- a supporting column is arranged on the base; the identification module is a camera and is located on the supporting column; a first opening is formed in an end surface, corresponding to the supporting column, of the roller; and at an initial position, the identification module is arranged in a manner of corresponding to the first opening.

Preferably, a shooting angle of the camera is tilting.

Preferably, a rear end surface of the roller is provided with a first gear; an upper surface of the base is sunken downwards to form an avoiding slot matched with the roller; one end of the supporting column located in the avoiding slot is opposite to an end surface of the roller; the avoiding slot is provided with a first receiving slot for carrying the roller; the base is provided with a motor electrically connected to the circuit board to drive the roller to rotate; a rotating shaft of the motor is connected with a second gear engaged with the first gear; the second gear is located on the first receiving slot; and the roller rotates through the first gear when the motor drives the second gear to rotate.

Preferably, the base is provided with a Hall sensor electrically connected to the circuit board; the roller is provided with several magnetic suction pieces used in conjunction with the Hall sensor; and the circuit board controls the motor according to an electrical signal fed back by the Hall sensor.

Preferably, a second opening configured to waste or pet litter is formed in the roller; the second opening is located at a top of the roller when the roller is at the initial position; the base is provided with a collection cavity for collecting waste; a third opening communicated to the collection cavity is formed in the base; and the second opening is opposite to the third opening in a rotating process of the roller.

In addition, the present disclosure further provides a control method applicable to the pet toilet described above, wherein the control method includes steps of:

- identifying, through the identification module, that a pet has entered the roller;
- identifying, through the identification module, that the pet has left the roller; and
- performing a waste cleaning action to control the roller to rotate to discharge waste.

Preferably, in the process of performing a waste cleaning action, the control method further includes steps of:

- receiving an electrical signal fed back by the detection module; and
- controlling the roller to stop rotating when the electrical signal fed back by the detection module has been received.

Preferably, before the step of performing a waste clearing action, the control method further includes a step of:

- identifying, through the identification module, that no pet enters the roller within a first preset time period.

Preferably, after the step of identifying, through the identification module, that a pet has entered the roller, the control method further includes a step of:

starting a timer, and forming first time.

Preferably, after the step of identifying, through the identification module, that a pet has entered the roller, the control method further includes a step of:

recording first data, wherein the first data includes a number of times of entry and a quantity of pets that have entered the roller for defecation; the number of times of entry is a serial number of a pet entering the roller within one waste cleaning cycle; the quantity of pets that have entered the roller for defecation is an actual quantity of pets that have entered the roller and defecated plus 1; and the actual quantity of pets that have entered the roller and defecated is a quantity of pets that have accumulatively entered the roller within one waste cleaning cycle and stayed for a second preset time period.

Preferably, after the step of identifying, through the identification module, that the pet has left the roller, the control method further includes a step of:

matching the first data.

Preferably, after the step of identifying, through the identification module, that the pet has left the roller, the control method further includes steps of:

stopping the timer;

determining whether the first time is greater than a second preset time period; and if yes, recording that the quantity of pets that have entered the roller for defecation is the actual quantity of pets that have entered the roller and defecated.

Preferably, after the step of determining whether the first time is greater than a second preset time period, the control method further includes a step of:

if no, subtracting the quantity of pets that have entered the roller for defecation by 1.

Preferably, the control method further includes a weighing sensor for weighing, arranged on the roller or the base, wherein the circuit board is electrically connected to the weighing sensor;

before the step of starting a timer, the control method further includes a step of: detecting, through the weighing sensor, that a weight increases;

before the step of stopping the timer, the control method further includes a step of: detecting, through the weighing sensor, that the weight decreases;

the first data further includes a first weight; and the first weight is an increased weight.

Preferably, before the step of performing a waste clearing action, the control method further includes a step of:

within the first preset time period, identifying, through the identification module to acquire an image inside the roller, that a pet has entered the roller, and starting to perform the control method from the step of identifying, through the identification module, that a pet has entered the roller;

or, within the first preset time period, detecting, through the weighting sensor, that a weight increases, and starting to perform the control method from the step of detecting, through the weighting sensor, that a weight increases.

Preferably, after the step of performing a waste cleaning action, the control method further includes a step of:

clearing the first time and the first data.

Compared with the prior art, the present disclosure has the beneficial effects below: In the present disclosure, the identification module is arranged on the pet toilet. The identification module is used to acquire an image inside the roller, so as to identify that a pet enters and leaves the roller. Therefore, the circuit board controls the roller to rotate after the identification module identifies that the pet has left the roller, so as to solve the problem of misjudgment easily caused by the fact that only a weighing sensor is used to perform waste cleaning in the prior art. The probability of misjudgment on the defecation of a pet is effectively reduced; the number of times of rotation of the roller is reduced; and the power consumption is reduced.

BRIEF DESCRIPTION OF THE DRAWINGS

In order to explain the technical solutions of the embodiments of the present disclosure more clearly, the following will briefly introduce the accompanying drawings used in the embodiments. Apparently, the drawings in the following description are only some embodiments of the present disclosure. Those of ordinary skill in the art can obtain other drawings based on these drawings without creative work.

FIG. 6 is a partial flowchart of a control method for a pet toilet according to the present disclosure.

DETAILED DESCRIPTION OF THE EMBODIMENTS

Figure 1:
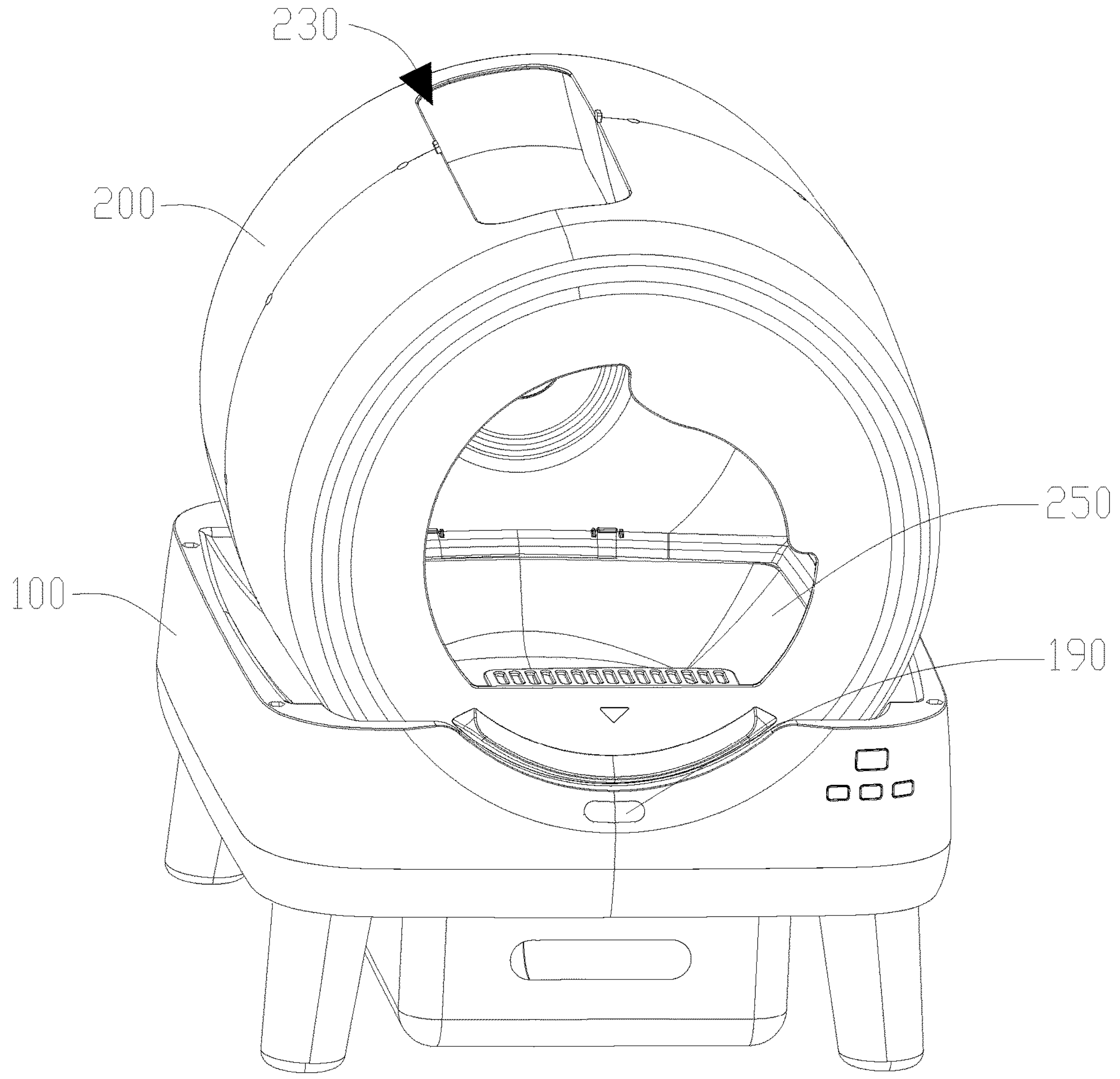
FIG. 1 is a three-dimensional diagram of a pet toilet according to the present disclosure.
Figure 2:
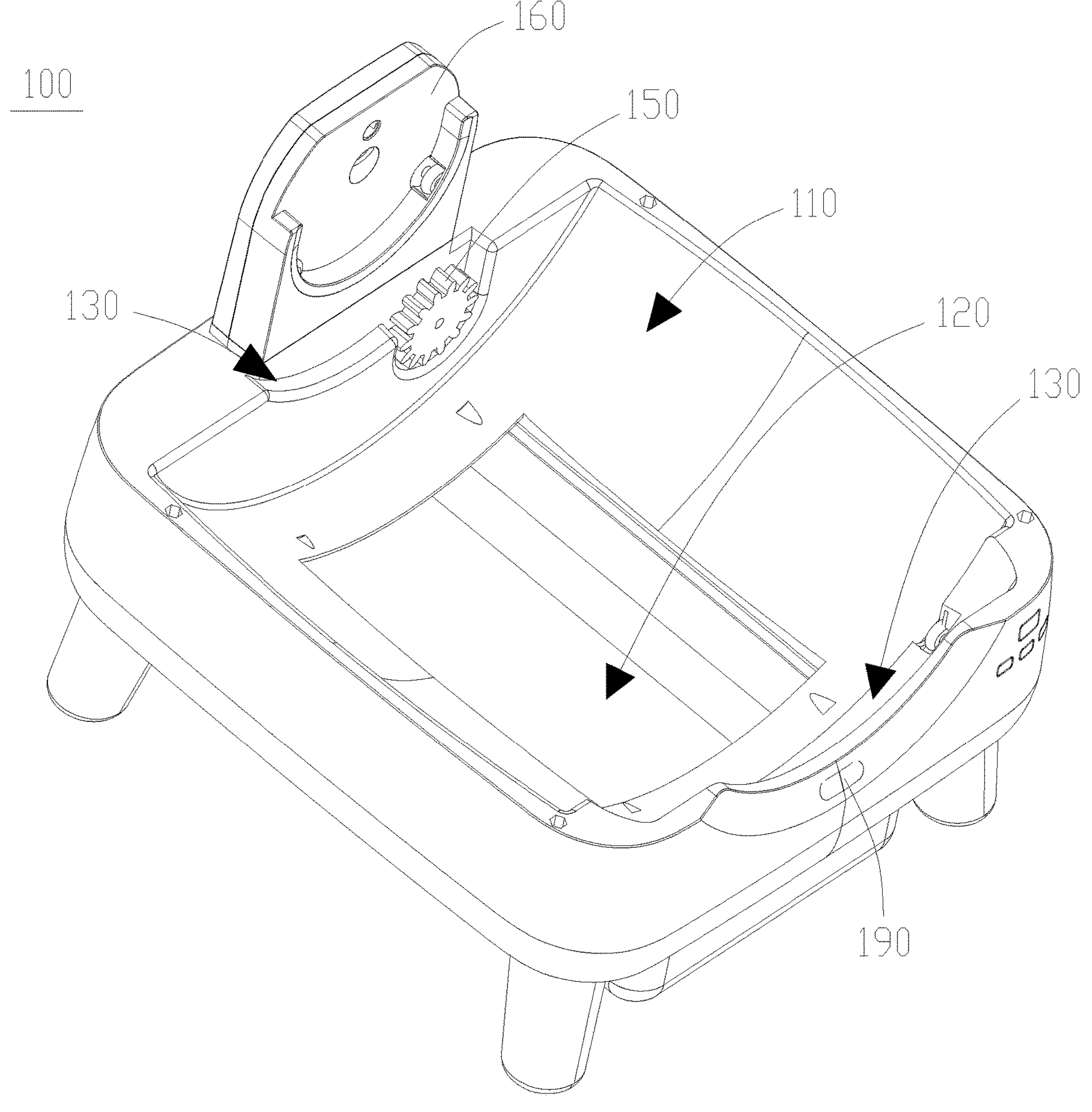
FIG. 2 is a structural diagram of a base on a pet toilet according to the present disclosure.
Figure 3:
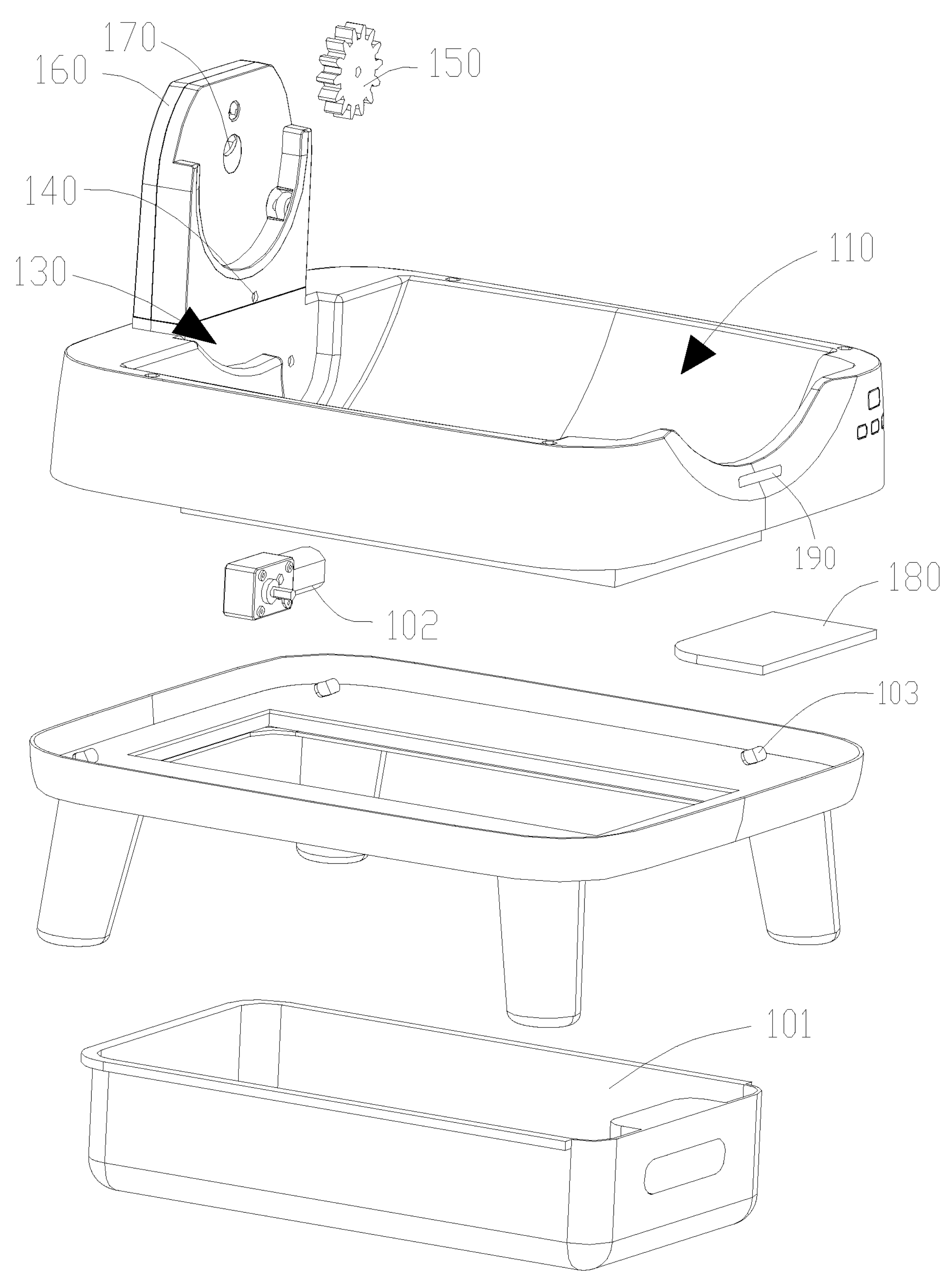
FIG. 3 is an exploded diagram of a base on a pet toilet according to the present disclosure.
Figure 4:
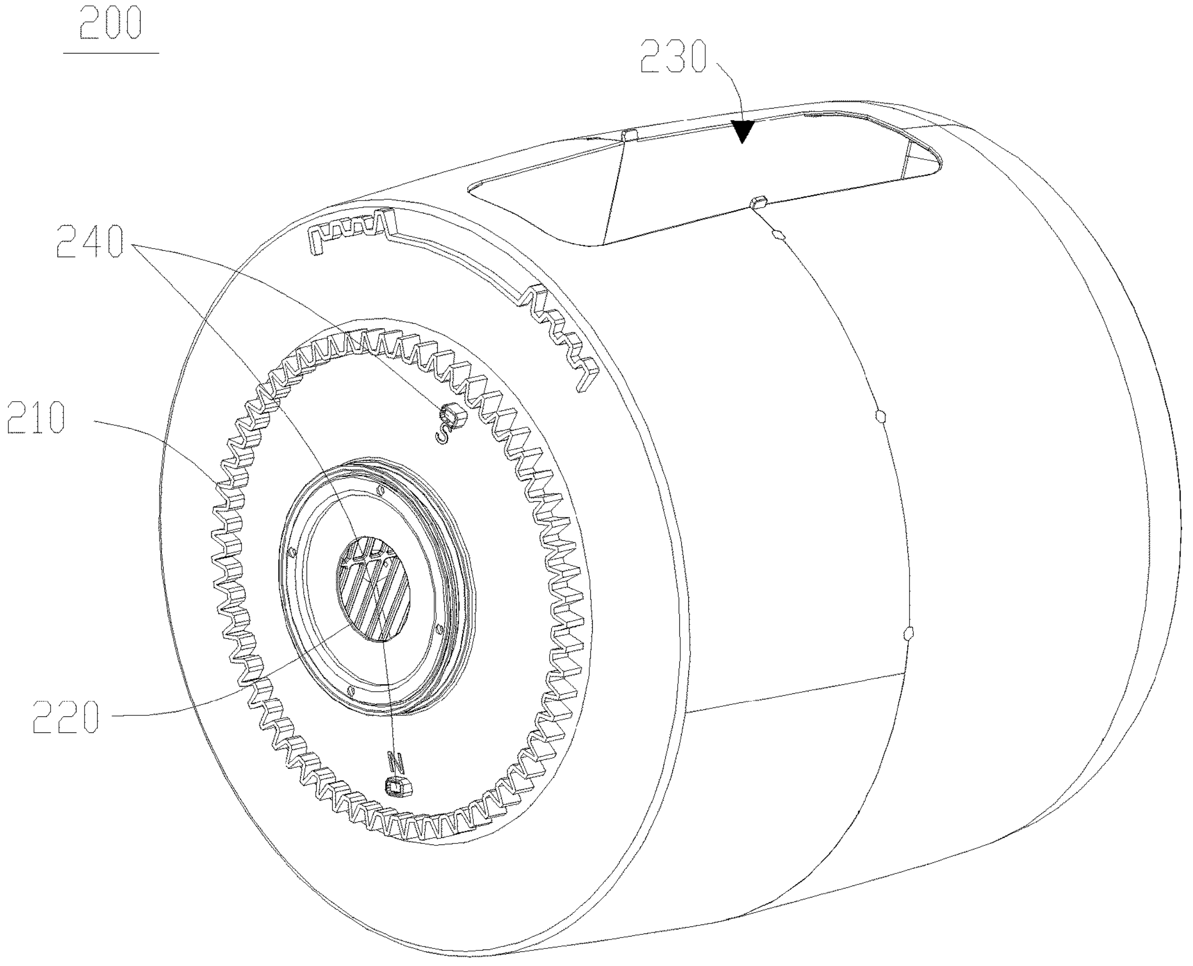
FIG. 4 is a structural diagram of a roller on a pet toilet according to the present disclosure.

The accompanying drawings in the embodiment of the present disclosure are combined, The technical scheme in the embodiment of the present disclosure is clearly and completely described, Obviously, the described embodiment is only a part of the embodiment of the present disclosure, but not all embodiments are based on the embodiment of the present disclosure, and all other embodiments obtained by ordinary technicians in the field on the premise of not doing creative work belong to the protection range of the present disclosure.

Referring to FIG. 1 to FIG. 4, a pet toilet in the embodiments of the present disclosure is provided.

The pet toilet includes a circuit board 180, an identification module 170, a base 100, and a roller 200 rotatably arranged on the base 100. The identification module 170 is electrically connected to the circuit board 180 to acquire an image, and the circuit board 180 controls the roller 200 to rotate according to a signal fed back by the identification module 170.

In this embodiment, the identification module 170 is arranged on the pet toilet. The identification module 170 is used to acquire an image inside the roller 200, so as to identify that a pet enters and leaves the roller 200. Therefore, the circuit board 180 controls the roller 200 to rotate after the identification module 170 identifies that the pet has left the roller 200, so as to solve the problem of misjudgment easily caused by the fact that only a weighing sensor is used to perform waste cleaning in the prior art. The probability of misjudgment on the defecation of a pet is effectively reduced; the number of times of rotation of the roller 200 is reduced; and the power consumption is reduced.

In an embodiment, the pet toilet further includes a detection module 190 electrically connected to the circuit board

180 to detect get close of an object; and the circuit board 180 controls the roller 200 to stop rotating according to a signal fed back by the detection module 190. When a pet, a person, or an object gets close to the roller 200, the detection module 190 can detect the pet, the person, or the object and stop the roller 200 from rotating, so as to prevent harm to the pet or the person and to achieve a protection effect.

In an embodiment, the pet toilet further includes a weighing sensor 103 for weighing, arranged on the roller 200 or the base 100, and the circuit board 180 is electrically connected to the weighing sensor 103. The weighing sensor 103 can also stop the roller 200 from rotating when detecting a weight change, so as to achieve a protection effect in the pet toilet without the detection module 190.

In the embodiment with the detection module 190, circuit board 180 can control the roller 200 to rotate according to an electrical signal fed back by the weighing sensor 103 and a signal fed back by the identification module 170, so as to achieve waste cleaning after effectively determining that a pet has entered and then left the roller 200, which can further reduce the misjudgment rate of waste cleaning.

Specifically, in the above embodiment, the roller 200 is provided with an entrance/exit 250, and the detection module 190 is arranged at or near the entrance/exit 250, so as to play a detection role when the pet, the person, or the object gets close to the roller 200. Specifically, the detection module 190 can be arranged at the entrance/exit 250, and can also be arranged on the base 100, or at a position near the entrance/exit 250 of the roller 200, or even inside the roller 200, or the like.

A supporting column 160 is arranged on the base 100, and the identification module 170 is a camera and is located on the supporting column 160. A first opening 220 is formed in an end surface, corresponding to the supporting column 160, of the roller 200; and at an initial position, the identification module 170 is arranged in a manner of corresponding to the first opening 220. That is, when the roller 200 is not in a waste cleaning state, the identification module 170 is opposite to the first opening 220, so that the identification module 170 can capture an environmental image inside the roller 200 to identify a pet entering and leaving the roller 200. Most preferably, a shooting angle of the identification module 170 is tilting, so as to prevent a house of a user through the entrance/exit 250 and prevent privacy infringement. Of course, in other embodiments, the identification module 170 can also be arranged inside the roller 200.

The circuit board 180 can be arranged on the base 100, and the detection module 190 can be an infrared sensor, an ultrasonic sensor, a radar sensor, and the like. Of course, in other embodiments, the circuit board 180 can also be arranged on the roller 200 or the supporting column 160, or even arranged externally to independently form a controller. The position of the circuit board 180 will not be limited here.

In an embodiment, a rear end surface of the roller 200 is provided with a first gear 210. An upper surface of the base 100 is sunken downwards to form an avoiding slot 110 matched with the roller 200; one end of the supporting column 160 located in the avoiding slot 110 is opposite to an end surface of the roller 200; the avoiding slot 110 is provided with a first receiving slot 130 for carrying the roller 200; the base 100 is provided with a motor 102 electrically connected to the circuit board 180 to drive the roller 200 to rotate; a rotating shaft of the motor 102 is connected with a second gear 150 engaged with the first gear 210; and the second gear 150 is located on the first receiving slot 130. In this way, when the motor 102 drives the second gear 150 to rotate, the roller 200 rotates through the first gear 210.

In an embodiment, the base 100 is provided with a Hall sensor 140 electrically connected to the circuit board 180; and the roller 200 is provided with several magnetic suction pieces 240 used in conjunction with the Hall sensor 140. The circuit board 180 controls the motor 102 according to an electrical signal fed back by the Hall sensor 140. When the roller 200 rotates to a certain position, namely, when the magnetic suction pieces 240 move to a certain position, the Hall sensor 140 feeds back a signal to the circuit board 180 when detecting a change in a magnetic field. The circuit board 180 controls the motor 102 to work according to the signal.

Specifically, the magnetic suction pieces 240 can be magnets. A second opening 230 configured to discharge waste or pet litter is formed in the roller 200; the second opening 230 is located at a top of the roller 200 when the roller 200 is at the initial position; the base 100 is provided with a collection cavity 101 configured to collect waste; a third opening 120 communicated to the collection cavity 101 is formed in the base 100; and the second opening 230 is opposite to the third opening 120 in a rotating process of the roller 200. Therefore, the waste on the roller 200 can fall into the collection cavity 101 via the second opening 230 and the third opening 120.

In an embodiment, the Hall sensor 140 is located on the supporting column 160; there are two magnetic suction pieces 240; one magnetic suction piece 240 is opposite to the Hall sensor 140 when the roller 200 is at the initial position; and the other magnetic suction piece 240 is opposite to the Hall sensor 140 when the third opening 120 directly faces the third opening 120. In this way, when the roller 200 rotates and the second opening 230 is opposite the third opening 120, the Hall sensor 140 feeds back a signal to the circuit board 180 when detecting a change in the magnetic field. The circuit board 180 controls the motor 102 to rotate anticlockwise according to the signal. When the roller 200 returns to the initial position, the Hall sensor 140 feeds back a signal to the circuit board 180 when detecting a change in the magnetic field again. The circuit board 180 controls the motor 102 to stop rotating according to the signal, so as to control the roller 200 to rotate.

Figure 5:
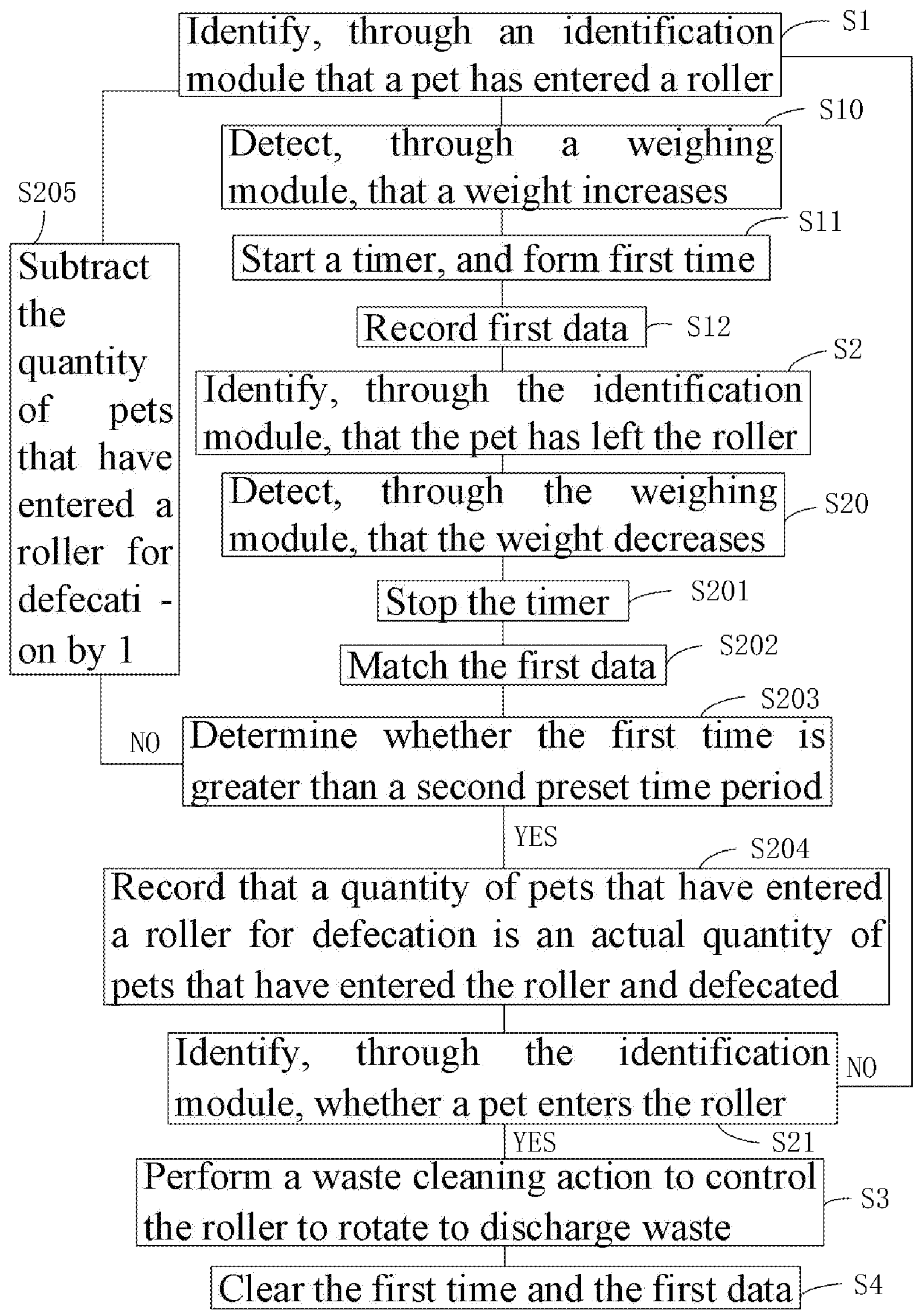
FIG. 5 is a flowchart of a control method for a pet toilet according to the present disclosure.

Referring to FIG. 5, the present disclosure further provides a control method applicable to the pet toilet described above. The control method includes the following steps:

S1, it is identified through the identification module 170 that a pet has entered the roller 200.

S2, it is identified through the identification module 170 that the pet has left the roller 200.

S3, a waste cleaning action is performed to control the roller 200 to rotate to discharge waste.

Therefore, the circuit board 180 can identify a pet entering and leaving the roller 200 through the image captured by the identification module 170. After the pet leaves the roller 200, the circuit board controls the roller 200 to rotate, that is, performing a waste cleaning action to discharge waste from the roller 200. This prevents a misjudgment on performing a waste clearing operation due to the fact that a pet sleeps on the top of the roller 200 or steps on the top of the roller 200, and reduces the misjudgment of waste cleaning.

In an embodiment, referring to FIG. 6, in the process of step S3, the control method further includes steps of:

S31, an electrical signal fed back by the detection module 190 is received; and S32, the roller 200 is controlled to stop rotating when the electrical signal fed back by the detection module 190 has been received.

That is, the circuit board 180 further receives the electrical signal fed back by the detection module 190, and controls the roller 200 to stop rotating when the electrical signal fed back by the detection module 190 has been received. When a pet, a person, or an object approaches the roller 200, the roller 200 stops rotating to achieve a protection effect.

In an embodiment, before step S3, the control method further includes a step as follows:

S21, whether a pet has entered the roller 200 is identified through the identification module 170 within a first preset time period.

If no, step S3 is executed.

After the pet enters the roller 200 and leaves the roller 200, if the circuit board 180 identifies through the identification module 170 that no pet enters the roller 200 within the first preset time period, namely, if no pet enters the roller 200, step S3 is executed. The first preset time period is reserved to provide time for caking between feces of the pet and pet litter, so as to prevent such a phenomenon that if the roller 200 rotates before the feces of the pet is caked with the pet litter, the roller 200 will be stained by the feces. Specifically, the first preset time period can be 3 minutes, 5 minutes, 10 minutes, 20 minutes, and the like.

In an embodiment, after step S1, the control method further includes a step as follows:

Step S11, a timer is started, and first time is formed, so as to record a duration, during which, the pet enters the roller 200.

In an embodiment, after step S1, the control method further includes a step as follows:

S12, first data is recorded, wherein the first data includes a number of times of entry and a quantity of pets that have entered the roller. The number of times of entry is a serial number of a pet entering the roller within one waste cleaning cycle; the quantity of pets that have entered the roller for defecation is an actual quantity of pets that have entered the roller and defecated plus 1; and the actual quantity of pets that have entered the roller and defecated is a quantity of pets that have accumulatively entered the roller 200 within one waste cleaning cycle and stayed for a second preset time period, so that a user can monitor a condition of the pet toilet of this embodiment before waste cleaning.

In an embodiment, after step S2 and before step S41, the control method further includes steps as follows:

S201, the timer is stopped, wherein the formed first time is stay time of the pet in the roller 200.

S202, the first data is matched. That is, the first time is matched with the first data obtained after a pet enters the roller 200 at the last time, so as to determine a serial number of a pet that has entered the roller 200 at the first time within one waste cleaning cycle.

S203, whether the first time is greater than a second preset time period is determined.

S204, if yes, it is recorded that the quantity of pets that have entered the roller for defecation is the actual quantity of pets that have entered the roller and defecated, so as to determine an actual quantity of pets that have entered the roller within one waste cleaning cycle, so that the user can monitors the health states of the pets.

It should be understood that when the first time is greater than the second preset time period, it is determined that the pet enters the roller 200 for defecation, rather than jumping into the roller 200 and then directly jumping out of the roller 200 while playing, so as to reduce the misjudgment of performing the waste cleaning action.

In addition, it should be noted that step S401 and step S402 do not have an execution order, and the execution order of step S401 and step S402 is not limited here.

In an embodiment, after S203, the control method further includes a step as follows:

S205, if no, the quantity of pets that have entered the roller is subtracted by 1, and the flow is started to be executed from step S1. That is, when the first time is less than the second preset time period, it indicates that the pet does not use the toilet in the roller 200, which is an invalid number of times of defecation.

Specifically, in the embodiment described above, the second preset time period can be 5 seconds, 7 seconds, and the like, and manufacturers can customize the second preset time period according to a need.

In an embodiment, after the step of executing a waste cleaning action, the control method further includes a step as follows:

S4, the first time and the first data are cleared. This can release data and prevent data accumulation from affecting the running speed of the entire method.

In the control method for the pet toilet with the weighing sensor 103, before step S11 that a timer is started, the control method further includes a step of:

S10, it is detected through the weighing sensor 103 that a weight increases.

That is, only when receiving an electrical signal fed back by the identification module 170 and an electrical signal fed back by the weighing sensor 103 and indicating a weight increase, the circuit board 180 determines that a pet has entered the roller 200, and next step S2 is executed. It should be noted that step S1 can be executed before step S10 or after step S10, and an execution order of step S1 and step S10 is not limited.

Before step S201 that the timer is stopped, the control method further includes a step of:

S20, it is detected that the weight decreases through the weighing sensor 103.

That is, only when receiving an electrical signal fed back by the identification module 170 and an electrical signal fed back by the weighing sensor 103 and indicating a weight decrease, the circuit board 180 determines that a pet has left the roller 200, and next step S3 is executed. It should be noted that step S2 can be executed before step S20 or after step S20, and an execution order of step S2 and step S20 is not limited.

In this embodiment, the first data also includes a first weight. The first weight is an increased weight. During matching of the first data, the pet entering the roller and the pet leaving the roller are matched by weight. When the quantity of pets that have entered the roller for defecation corresponds to the actual quantity of pets that have entered the roller and defecated, the serial number and the actual quantity of pets that have entered the roller and defecated are recorded for monitoring by a user.

In step S21, if it is identified through the identification module 170 that a pet has entered the roller 200 within the first preset time period, step S1 is repeated. Or, within the first preset time period, it is detected through the weighting sensor 103 that a weight increases, and the control method is started to be performed from the step that it is detected through the weighting sensor 103 that a weight increases.

That is, it is identified through the identification module 170 that a pet has entered the roller 200 within the first preset time period, the flow of the control method is started to be executed from step S1. In this flow, if no waste cleaning action is performed within the consecutive first preset time period, after a third preset time period, the waste cleaning action can be directly performed after the pet leaves the roller 200, instead of waiting for the first preset time period. This prevents the impact on use due to excessive waste in the roller 200. If the waste cleaning action is not performed within the first preset time period for 8 hours within the third preset time period for three, four, or five consecutive times, after 8 hours, the waste cleaning action can be directly performed when the circuit board 180 identifies no pet through the identification module 170. In other embodiments, the third preset time period can be 24 hours, 12 hours, or the like. A duration of the third preset time period is not limited.

It should be noted that all directional indications (such as up, down, left, right, front, back . . . ) in the embodiments of the present disclosure are only used to explain a relative positional relationship between components, motion situations, etc. at a certain specific attitude (as shown in the figures). If the specific attitude changes, the directional indication also correspondingly changes.

In addition, the descriptions of “first”, “second”, etc. in the present disclosure are only used for descriptive purposes, and cannot be understood as indicating or implying its relative importance or implicitly indicating the number of technical features indicated. Therefore, features defined by “first” and “second” can explicitly instruct or impliedly include at least one feature. In addition, “and/or” in the entire text includes three solutions. A and/or B is taken as an example, including technical solution A, technical solution B, and technical solutions that both A and B satisfy. In addition, the technical solutions between the various embodiments can be combined with each other, but it needs be based on what can be achieved by those of ordinary skill in the art. When the combination of the technical solutions is contradictory or cannot be achieved, it should be considered that such a combination of the technical solutions does not exist, and is not within the scope of protection claimed by the present disclosure.

The above descriptions are only preferred embodiments of the present disclosure, and are not intended to limit the patent scope of the present disclosure. Any equivalent structural transformation made by using the content of the specification and the drawings of the present disclosure under the invention idea of the present disclosure, directly or indirectly applied to other related technical fields, shall all be included in the scope of patent protection of the present disclosure.

What is claimed is:

1. A control method applicable to a pet toilet, the pet toilet comprising a circuit board, an identification module, a base, and a roller rotatably arranged on the base, wherein the identification module is electrically connected to the circuit board to acquire an image inside the roller by the identification module, and the circuit board controls the roller to rotate after the identification module identifies that a pet has left the roller;

the pet toilet further comprising a detection module electrically connected to the circuit board to detect presence of an object, wherein the circuit board controls the roller to stop rotating according to a signal fed back by the detection module; wherein the control method comprises steps of:

acquiring the image inside the roller by the identification module;

identifying, by the circuit board based on the image, that a pet has entered the roller;

identifying, by the circuit board based on the image, that the pet has left the roller; and performing a waste cleaning action to control the roller to rotate to discharge waste after identifying that the pet has left the roller;

wherein in the step of performing the waste cleaning action, the control method further comprises steps of:

receiving an electrical signal fed back by the detection module; and controlling the roller to stop rotating when the electrical signal fed back by the detection module has been received;

wherein before the step of performing the waste clearing action, the control method further comprises a step of:

identifying, through the identification module, that no pet enters the roller within a first preset time period, wherein after the step of identifying, through the identification module, that the pet has entered the roller, the control method further comprises a step of:

starting a timer, and forming first time;

wherein after the step of identifying, through the identification module, that the pet has entered the roller, the control method further comprises a step of:

recording first data, wherein the first data comprises a number of times of entry and a quantity of pets that have entered the roller for defecation; the number of times of entry is a number of times of the pet entering the roller within one waste cleaning cycle; the quantity of pets that have entered the roller for defecation is an actual quantity of pets that have entered the roller and defecated plus 1; and the actual quantity of pets that have entered the roller and defecated is a quantity of pets that have accumulatively entered the roller within one waste cleaning cycle and stayed for a second preset time period.

2. The control method for the pet toilet according to claim 1, wherein after the step of identifying, through the identification module, that the pet has left the roller, the control method further comprises a step of:

matching the first data.

3. A control method applicable to a pet toilet, the pet toilet comprising a circuit board, an identification module, a base, and a roller rotatably arranged on the base, wherein the identification module is electrically connected to the circuit board to acquire an image inside the roller by the identification module, and the circuit board controls the roller to rotate after the identification module identifies that a pet has left the roller;

the pet toilet further comprising a detection module electrically connected to the circuit board to detect presence of an object, wherein the circuit board controls the roller to stop rotating according to a signal fed back by the detection module; wherein the control method comprises steps of:

acquiring the image inside the roller by the identification module;

identifying, by the circuit board based on the image, that a pet has entered the roller;

identifying, by the circuit board based on the image, that the pet has left the roller; and performing a waste cleaning action to control the roller to rotate to discharge waste after identifying that the pet has left the roller;

wherein in the process of performing a waste cleaning action, the control method further comprises steps of:

receiving an electrical signal fed back by the detection module; and controlling the roller to stop rotating when the electrical signal fed back by the detection module has been received;

wherein before the step of performing a waste clearing action, the control method further comprises a step of:

identifying, through the identification module, that no pet enters the roller within a first preset time period, wherein after the step of identifying, through the identification module, that a pet has entered the roller, the control method further comprises a step of:

starting a timer, and forming first time;

wherein after the step of identifying, through the identification module, that the pet has left the roller, the control method further comprises steps of:

stopping the timer;

determining whether the first time is greater than a second preset time period; and recording that a quantity of pets that have entered the roller for defecation is an actual quantity of pets that have entered the roller and defecated.

4. The control method for the pet toilet according to claim 3, wherein after the step of determining whether the first time is greater than the second preset time period, the control method further comprises a step of:

if no, subtracting the quantity of pets that have entered the roller for defecation by 1.

5. The control method for the pet toilet according to claim 4, wherein the pet toilet further comprises a weighing sensor for weighing, arranged on the roller or the base, wherein the circuit board is electrically connected to the weighing sensor;

before the step of starting the timer, the control method further comprises a step of: detecting, through the weighing sensor, that a weight increases;

before the step of stopping the timer, the control method further comprises a step of: detecting, through the weighing sensor, that the weight decreases;

wherein the first data further comprises a first weight.

6. The control method for the pet toilet according to claim 5, wherein before the step of performing the waste clearing action, the control method further comprises a step of:

within the first preset time period, identifying, through the identification module, that a pet has entered the roller, and starting to perform the control method from the step of identifying, through the identification module, that a pet has entered the roller;

or, within the first preset time period, detecting, through the weighting sensor, that a weight increases, and starting to perform the control method from the step of detecting, through the weighting sensor, that a weight increases.

7. The control method for the pet toilet according to claim 6, wherein after the step of performing the waste cleaning action, the control method further comprises a step of:

clearing the first time and the first data.

* * * * *